(No Model.)

J. F. PLUMMER & H. P. CHAPMAN.
SELF LOCKING NUT.

No. 472,465. Patented Apr. 5, 1892.

Witnesses
Nathan Clifford.
E. H. Verrill.

Inventors.
John F. Plummer
Henry P. Chapman
By Elgin C. Verrill,
Attorney.

UNITED STATES PATENT OFFICE.

JOHN F. PLUMMER, OF PARIS, MAINE, AND HENRY P. CHAPMAN, OF IVORYTON, CONNECTICUT.

SELF-LOCKING NUT.

SPECIFICATION forming part of Letters Patent No. 472,465, dated April 5, 1892.

Application filed December 14, 1891. Serial No. 415,079. (No model.)

*To all whom it may concern:*

Be it known that we, JOHN F. PLUMMER, of Paris, county of Oxford, and State of Maine, and HENRY P. CHAPMAN, of Ivoryton, in the county of Middlesex and State of Connecticut, have invented certain new and useful Improvements in Self-Locking Nuts; and we do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1:
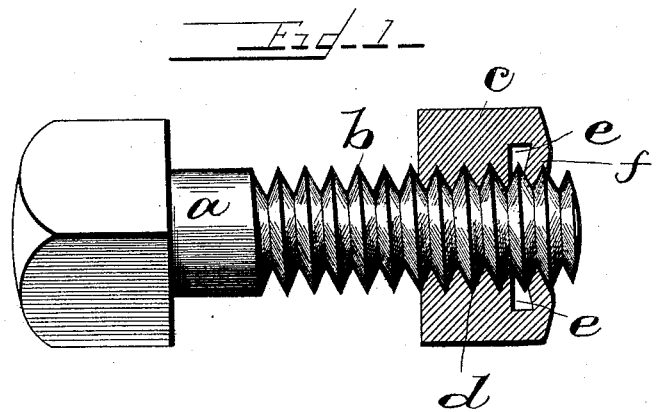
Figure 2:
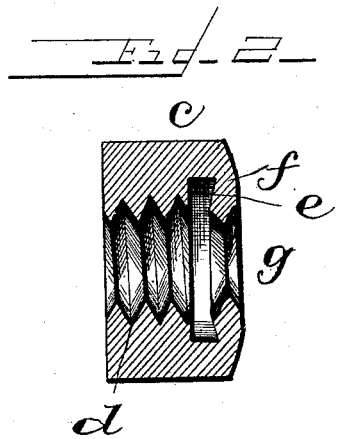

Figure 1 is a sectional view of the nut in position on a bolt. Fig. 2 is a sectional view of the nut separate from the bolt, and same letters refer to like parts.

Our invention relates to improvements in self-locking nuts and in the method of constructing the same.

It consists of a nut having an exterior rim or flange formed by an interior groove, the thread in said rim being thrown permanently out of alignment with the thread in the body of the nut, and also with the thread of the bolt upon which it is placed, by forcing said rim outward or inward.

In the drawings herewith accompanying and making a part of this specification, $a$ represents a bolt having a thread $b$ cut thereon, and $c$ a nut having a thread $d$ cut therein. In said nut is made the interior annular groove $e$, near one face of the nut, which leaves a thin flange or rim $f$, having threads therein, as shown in Fig. 1. The inner edge $g$ of said rim is then permanently upset, either outwardly or inwardly, the latter way being shown in Fig. 2, until the thread in the said rim is thrown slightly out of alignment with that in the body of the nut throughout its whole circumference.

The operation of our improved locking-nut is as follows: The nut is screwed upon the bolt, and when that part of the thread that is upset comes in contact with the thread of the bolt it causes it to bind, so that the nut will be held firmly thereby. The nut, however, may be readily turned back and forth by a wrench, but cannot be turned by any ordinary jar, the throwing out of alignment of the threads causing sufficient friction between the threads of the nut and the bolt to hold the nut in whatever position it may be left.

We are aware that locking-nuts have been made having an interior annular groove near that face which is adapted to rest against the body to be bolted, said face being crowning, so that when the nut is screwed tightly against the body to be bolted the rim formed by said groove is sprung back into the groove, thus throwing the thread in that part out of alignment with those on the bolt. A nut thus constructed is inapplicable for use on woodwork, because the wood would give before the metal, so that it would not lock, and even if it did lock at first, as soon as the wood should shrink the nut would cease to be locked and would then be like any ordinary nut. When used on metal, if by any chance the nut gets loosened ever so slightly it is thereby unlocked. It is manifest that all these disadvantages are overcome in the present invention, inasmuch as the nut is always locked in whatever position on the bolt it may be.

Having thus described our invention and its use, what we claim, and desire to secure by Letters Patent of the United States, is—

1. A self-locking nut having an interior annular groove and the rim formed by said groove permanently upset, the threads in said rim being thereby thrown permanently out of alignment with those on the body of the nut and those on the bolt, substantially as and for the purposes set forth.

2. A self-locking nut having an interior annular groove near one end thereof, the narrow rim thus formed permanently bent inwardly, the point of bending being at the bottom of the groove, the threads in said rim being thereby thrown permanently out of alignment with the threads in the body of the nut, whereby the threads in the nut are caused to bind laterally against the threads in the bolt, substantially as and for the purposes set forth.

In testimony that we claim the foregoing as our own we affix my signatures in presence of two witnesses.

JOHN F. PLUMMER.
HENRY P. CHAPMAN.

Witnesses to J. F. P.:
   J. H. STUART,
   E. N. HASKELL.
Witnesses to H. P. C.:
   JAMES L. PHELPS,
   LYDIA A. PHELPS.